US012739711B2

(12) United States Patent
Hong

(10) Patent No.: US 12,739,711 B2
(45) Date of Patent: Sep. 15, 2026

(54) NEIGHBORING CELL MEASURING METHOD AND DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 595 days.

(21) Appl. No.: 18/267,346

(22) PCT Filed: Dec. 14, 2020

(86) PCT No.: PCT/CN2020/136258
§ 371 (c)(1),
(2) Date: Aug. 2, 2023

(87) PCT Pub. No.: WO2022/126343
PCT Pub. Date: Jun. 23, 2022

(65) Prior Publication Data

US 2024/0015609 A1 Jan. 11, 2024

(51) Int. Cl.
*H04W 24/02* (2009.01)
*H04B 7/06* (2006.01)
*H04W 36/00* (2009.01)

(52) U.S. Cl.
CPC ...... *H04W 36/0058* (2018.08); *H04B 7/0626* (2013.01)

(58) Field of Classification Search
CPC ........... H04W 36/0058; H04W 36/008; H04W 24/02; H04B 7/0626
See application file for complete search history.

(56) References Cited

U.S. PATENT DOCUMENTS

2021/0368374 A1* 11/2021 Cheng .................. H04W 24/10
2023/0055487 A1* 2/2023 Jin ........................ H04W 24/10
2024/0015781 A1* 1/2024 Jacobsen ............... H04L 5/0048

FOREIGN PATENT DOCUMENTS

CN 110856200 A 2/2020

OTHER PUBLICATIONS

PCT/CN2020/136258, English translation of International Search Report dated Sep. 1, 2021, 2 pages.

* cited by examiner

*Primary Examiner* — Jae Y Lee
*Assistant Examiner* — Nam P. Cao
(74) *Attorney, Agent, or Firm* — Cozen O'Connor

(57) ABSTRACT

A method for neighboring cell measurement includes: obtaining at least one measurement gap combination configured for a UE; and performing at least one of synchronization signal block (SSB)-based neighboring cell measurement or channel state information reference signal (CSI-RS)-based neighboring cell measurement based on the at least one measurement gap combination.

17 Claims, 2 Drawing Sheets sending at least one measurement gap combination to a UE to instruct the UE to perform SSB- based neighboring cell measurement and/or CSI-RS- based neighboring cell measurement based on the measurement gap combination
S301
FIG. 3
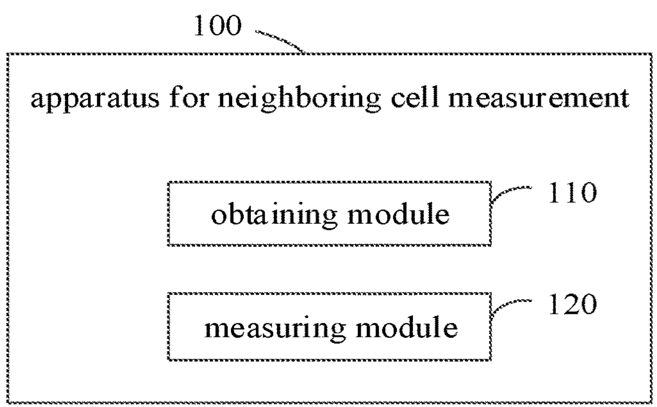
FIG. 4
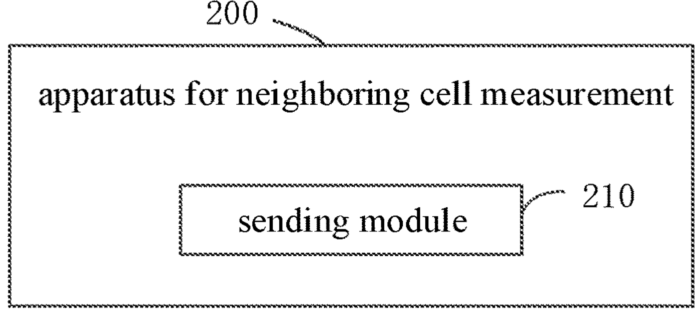
FIG. 5
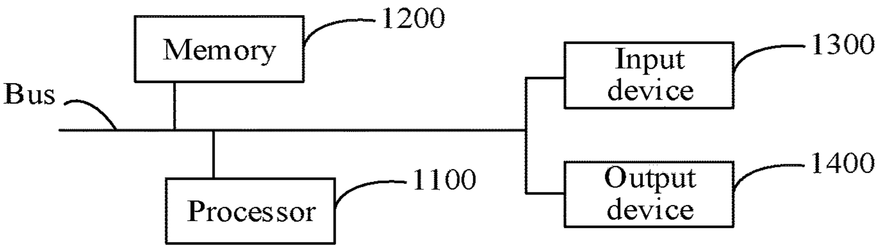
FIG. 6

NEIGHBORING CELL MEASURING METHOD AND DEVICE

CROSS-REFERENCE TO RELATED APPLICATION

This application is a U.S. national phase of International Application No. PCT/CN2020/136258, filed on Dec. 14, 2020, the entire content of which is incorporated herein by reference.

TECHNICAL FIELD

The disclosure relates to the mobile communication field, in particular to a method for neighboring cell measurement and a communication device.

BACKGROUND

A user equipment (UE), after being connected to a communication network, may still need to continuously search and measure radio channel qualities of neighboring cells, so as to perform handover at an appropriate time. In the related art, a measurement gap mechanism is defined for measuring the mobility of the neighboring cells, and the UE may perform neighboring cell measurement according to a measurement gap configured by a network device. That is, a certain time period is reserved, i.e., the measurement gap, during which the UE does not send and receive any data, but modulates a receiver to a frequency point of a neighboring cell to perform the neighboring cell measurement, and then switches to a cell where it is currently located when the gap is expired. In practice, under a radio resource control_CONNECTED (RRC_CONNECTED) state, the UE can perform the mobility measurement for the neighboring cells based on a synchronization signal block (SSB) and a channel state information reference signal (CSI-RS).

SUMMARY

According to a first aspect of embodiments of the disclosure, a method for neighboring cell measurement, performed by a UE, is provided. The method includes: obtaining at least one measurement gap combination configured for the UE; and performing at least one of synchronization signal block (SSB)-based neighboring cell measurement or channel state information reference signal (CSI-RS)-based neighboring cell measurement based on the at least one measurement gap combination.

According to a second aspect of embodiments of the disclosure, a method for neighboring cell measurement, performed by a network device, is provided. The method includes:

sending at least one measurement gap combination to a UE to instruct the UE to perform at least one of SSB-based neighboring cell measurement or CSI-RS-based neighboring cell measurement based on the measurement gap combination.

According to a third aspect of embodiments of the disclosure, a communication device is provided. The communication device includes: at least one processor and a memory communicatively connected to the at least one processor. The memory stores instructions executable by the at least one processor, and when the instructions are executed by the at least one processor, the at least one processor is caused to implement the method for neighboring cell measurement according to the first aspect of the embodiments of the disclosure or the method for neighboring cell measurement according to the second aspect of the embodiments of the disclosure.

According to a fourth aspect of embodiments of the disclosure, a computer storage medium having computer-executable instructions stored thereon is provided. When the computer-executable instructions are executed by a processor, the method for neighboring cell measurement according to the first aspect of the embodiments of the disclosure or the method for neighboring cell measurement according to the second aspect of the embodiments of the disclosure is implemented.

BRIEF DESCRIPTION OF THE DRAWINGS

FIG. 3 is a flowchart of a method for a neighboring cell measurement performed by a network device according to an embodiment of the disclosure.

FIG. 4 is a block diagram of an apparatus for a neighboring cell measurement according to an embodiment of the disclosure.

FIG. 5 is a block diagram of an apparatus for a neighboring cell measurement according to an embodiment of the disclosure.

FIG. 6 is a schematic diagram of a communication device according to an embodiment of the disclosure.

DETAILED DESCRIPTION

The embodiments of the disclosure are described in detail below, and examples of the embodiments are shown in the accompanying drawings, in which the same or similar numbers indicate the same or similar components or components having the same or similar functions. The embodiments described below with reference to the accompanying drawings are exemplary and are intended to be used to explain the disclosure and are not to be construed as limiting the disclosure.

Figure 1:
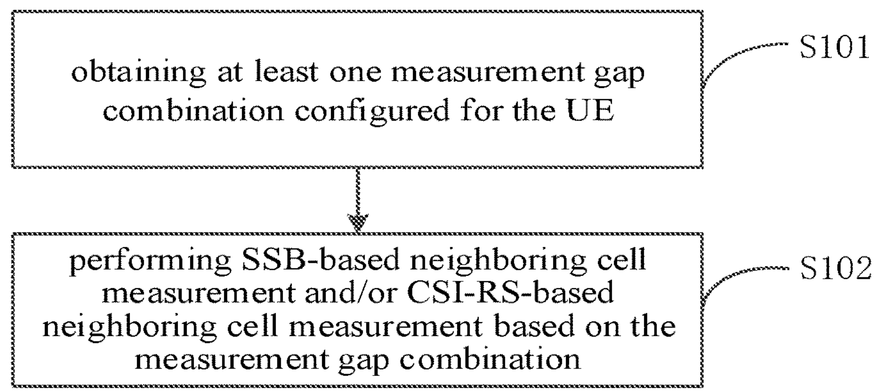
FIG. 1 is a flowchart of a method for neighboring cell measurement performed by a user equipment (UE) according to an embodiment of the disclosure.

FIG. 1 is a flowchart of a method for neighboring cell measurement according to an embodiment of the disclosure. The method is executed by a UE. As illustrated in FIG. 1, the method for neighboring cell measurement includes the following steps.

At step S101, at least one measurement gap combination configured for the UE is obtained.

When performing neighboring cell mobility measurement based on a synchronization signal block (SSB), the UE performs the neighboring cell mobility measurement according to configured SSB-based radio resource management (RRM) measurement timing configuration (SMTC). The SMTC can be configured as a length of 1 to 5 subframes. For a channel state information reference signal (CSI-RS)-based neighboring cell measurement, a CSI-RS resource can be sent on any slot in a period of 5 ms, 10 ms, 20 ms or 40 ms. The measurement gap length (MGL) in the related art may be {FR1: 3 ms, 4 ms and 6 ms} and {FR2: 2.5 ms, 3.5 ms and 5.5 ms}, and these durations of the measurement gap are mainly considered for an SSB-based neighboring cell mobility measurement. However, for a CSI-RS-based neighboring cell mobility measurement, the measurement gap length may be unable to include a length of the CSI-RS resource, which affects the measurement performance.

In an embodiment of the disclosure, in order to take into account both SSB-based and CSI-RS-based neighboring cell mobility measurements, at least one measurement gap combination is configured for the UE by a network device or a specification agreement, and the at least one configured measurement gap combination is sent to the UE. Optionally, the network device may configure the at least one measurement gap combination for the UE via a measurement configuration signaling, e.g., an IE MeasConfig signaling. That is, the measurement configuration signaling carries the at least one measurement gap combination configured for the UE. In some implementations, the network device sends a configuration parameter of the measurement gap combination to the UE synchronously with an SSB resource and the CSI-RS resource. In some implementations, the network device may send the configuration information of the measurement gap combination to the UE via the IE MeasConfig signaling before or after sending the SSB resource and the CSI-RS resource to the UE.

Optionally, the measurement gap combination at least includes a measure gap length (MGL), and a measurement gap repetition period (MGRP).

In a possible implementation, one measurement gap combination is configured for the UE. The MGL in the measurement gap combination configured by the network device is a maximum value of a length of the SMTC and a resource length of the CSI-RS resource. That is, considering both the SSB-based and CSI-RS-based neighboring cell mobility measurements, the configured MGL is able to be greater than or equal to the length of the CSI-RS resource, which realizes the measurement for CSI-RS signals.

It should be noted that the UE can perform the mobility measurement on neighboring cells on multiple carrier frequencies. The SMTC is configured according to the carrier frequencies, and different carriers can be configured with different SMTC periods, lengths and offset values. $D_{SMTC,i}$ represents a configured length of the SMTC on carrier i. $D_{CSI\text{-}RS,i}$ represents a length of the CSI-RS resource on the carrier i. The maximum value is determined by comparing the lengths of all SMTC and the lengths of all CSI-RS resources, and the maximum value is configured as the MGL in the measurement gap combination. For example, the maximum value is determined according to $MAX(D_{SMTC,i}, D_{CSI\text{-}RS,i})$. Optionally, a maximum value may be determined from all the SMTCs, and a maximum value may be determined from the lengths of all the CSI-RS resources, and then a greater one of the above two maximum values may be determined and configured as the MGL in the measurement gap combination, e.g., by $MAX(MAX_{D_{SMTC,i}}, MAX_{D_{CSI\text{-}RS,i}})$.

In another possible implementation, the network device configures a measurement gap combination for the SSB-based mobility measurement and a measurement gap combination for the CSI-RS-based mobility measurement for the UE, respectively, and each measurement gap combination includes a respective MGL and a respective MGRP. When configuring the measurement gap, for both the SSB-based and CSI-RS-based neighboring cell mobility measurements, the MGL in each measurement gap combination can meet the length requirement of neighboring cell mobility measurement.

At step S102, SSB-based neighboring cell measurement and/or CSI-RS-based neighboring cell measurement is performed based on the measurement gap combination.

After obtaining the configuration information of the measurement gap combination sent by the network device, the UE can obtain the MGL and the MGRP from the measurement gap combination and perform the neighboring cell mobility measurement based on the MGL and MGRP.

Optionally, the UE performs the mobility measurement on a SSB signal corresponding to the SSB resource within each MGRP according to the MGL, and selects an appropriate cell for handover based on the measured quality of the SSB signal.

Optionally, the UE performs the mobility measurement on a CSI-RS signal corresponding to the CSI-RS resource within each MGRP according to the MGL, and selects an appropriate cell for handover based on the measured quality of the CSI-RS signal.

Optionally, the UE performs the mobility measurement on a SSB signal corresponding to the SSB resource and a CSI-RS signal corresponding to the CSI-RS resource simultaneously within each MGRP according to the MGL, and selects an appropriate cell for handover based on the measured qualities of the SSB signal and the CSI-RS signal.

In an embodiment of the disclosure, the UE acquires at least one measurement gap combination configured for the UE, and performs SSB-based and/or CSI-RS-based neighboring cell measurements based on the measurement gap combination. By configuring the measurement gap combination, both the SSB-based and the CSI-RS-based neighboring cell mobility measurements can be supported, so that the UE can determine an appropriate cell for handover.

Figure 2:
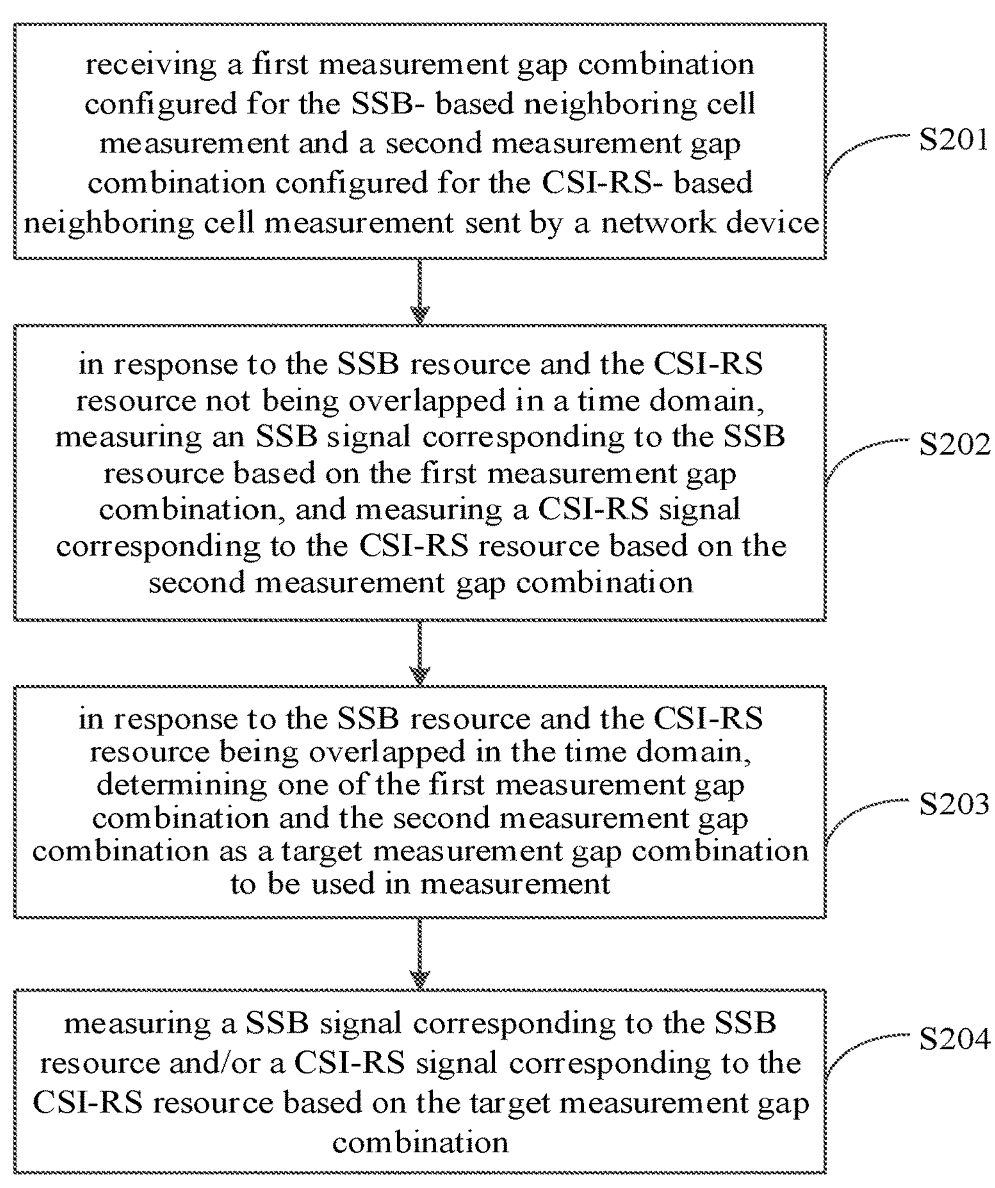
FIG. 2 is a flowchart of a method for neighboring cell measurement performed by a UE according to an embodiment of the disclosure.

The embodiment of the disclosure provides another method for neighboring cell measurement. FIG. 2 is a flowchart of another method for neighboring cell measurement according to an embodiment of the disclosure. The method is executed by a UE. As illustrated in FIG. 2, the method for neighboring cell measurement includes the following steps.

At step S201, a first measurement gap combination configured for SSB-based neighboring cell measurement and a second measurement gap combination configured for CSI-RS-based neighboring cell measurement sent by a network device are received.

The network device configures two measurement gap combinations simultaneously in a configuration signaling. One of the two measurement gap combinations is used for performing SSB-based neighboring cell measurement, which is referred to as the first measurement gap combination, for example, it can be labeled as gap pattern #1=$\{MGL_{SSB,i}, MGRP_{SSB,i}\}$. The other one of the two measurement gap combinations is used for performing CSI-RS-based neighboring cell measurement and can be referred to as the second measurement gap combination, which may be labeled as gap pattern #2=$\{MGL_{CSI\text{-}RS,i}, MGRP_{CSI\text{-}RS,i}\}$.

It is noted that the UE may perform mobility measurement on neighboring cells on multiple carrier frequencies. For the first measurement gap combination, a maximum value of configured lengths of the SMTC on each carrier may be configured as $MGL_{SSB,i}$ in gap pattern #1, in which $MGL_{SSB,i}$ is used to indicate a configured length of the SMTC on carrier i, and the configured length of the SMTC on the carrier i is a maximum length. For the second measurement gap combination, a maximum value of lengths of CSI-RS resources on each carrier may be configured as $MGL_{CSI\text{-}RS,i}$ in gap pattern #2, in which the $MGL_{CSI\text{-}RS,i}$ is used to indicate a length of a CSI-RS resource on carrier i, and the length of the CSI-RS resource on the carrier i is a maximum resource length.

Optionally, the network device configures the MGL and the MGRP of the first measurement gap combination and the MGL and the MGRP of the second measurement gap combination based on the SSB resource and the CSI-RS resource allocated for the UE.

At step S202, in response to the SSB resource and the CSI-RS resource not being overlapped in a time domain, an SSB signal corresponding to the SSB resource is measured based on the first measurement gap combination, and a CSI-RS signal corresponding to the CSI-RS resource is measured based on the second measurement gap combination.

At step S203, in response to the SSB resource and the CSI-RS resource being overlapped in the time domain, one of the first measurement gap combination and the second measurement gap combination is determined as a target measurement gap combination to be used in measurement.

In an implementation, the SSB resource and the CSI-RS resource configured for the UE by the network device may be overlapped with each other in the time domain. In an embodiment of the disclosure, the UE can determine whether the SSB resource and the CSI-RS resource are overlapped with each other in the time domain based on the configuration information of the SSB resource and the CSI-RS resource.

Optionally, in response to the SSB resource and the CSI-RS resource not being overlapped in the time domain, it means that the UE can perform the SSB-based neighboring cell measurement and the CSI-RS-based neighboring cell measurement separately in the time domain. In this case, the UE can measure an SSB signal corresponding to the SSB resource at a measurement time point corresponding to the SSB resource according to the first measurement gap combination, to implement the neighboring cell mobility measurement, and can also measure a CSI-RS signal corresponding to the CSI-RS resource at a measurement time point corresponding to the CSI-RS resource according to the second measurement gap combination.

Optionally, in response to the SSB resource and the CSI-RS resource being overlapped in the time domain, one of the first measurement gap combination and the second measurement gap combination is selected as the target measurement gap combination to be used in the measurement. In some implementations, optionally, the MGL in the first measurement gap combination and the MGL in the second measurement gap combination are compared, and a measurement gap combination corresponding to a maximum value of the two MGLs is used as the target measurement gap combination.

At step S204, an SSB signal corresponding to the SSB resource and/or a CSI-RS signal corresponding to the CSI-RS resource are measured based on the target measurement gap combination.

By using the measurement gap combination corresponding to the maximum value of the two MGLs as the target measurement gap combination, it is possible to ensure that the MGL is greater than or equal to the SMTC configured for performing SSB-based neighboring cell mobility measurement, and that the MGL is greater than or equal to the length of the CSI-RS resource for performing CSI-RS-based neighboring cell mobility measurement, so that both the SSB-based and CSI-RS-based neighboring cell mobility measurements can be supported simultaneously.

After obtaining the target measurement gap combination, the UE can obtain the MGL and MGRP from the target measurement gap combination and perform the neighboring cell mobility measurement according to the MGL and MGRP. That is, the UE performs mobility measurement on an SSB signal corresponding to the SSB resource and/or a CSI-RS signal corresponding to the CSI-RS resource within each MGRP according to the MGL. The UE can select an appropriate cell for handover based on the qualities of the SSB signal and/or the CSI-RS signal after obtaining the SSB signal and/or CSI-RS signal.

In the embodiments of the disclosure, the UE receives the first measurement gap combination configured for the SSB-based neighboring cell measurement and the second measurement gap combination configured for the CSI-RS-based neighboring cell measurement sent by the network device. When the SSB resource and the CSI-RS resource are not overlapped with each other in the time domain, the UE performs the SSB-based neighboring cell measurement based on the first measurement gap combination, and performs the CSI-RS-based neighboring cell measurement based on the second measurement gap combination. When the SSB resource and the CSI-RS resource are overlapped with each other in the time domain, the UE performs the SSB-based neighboring cell measurement and/or the CSI-RS-based neighboring cell measurement using the measurement gap combination with the maximum MGL in the two measurement gap combinations. In the embodiments, when configuring the measurement gap combination, both the SSB-based and CSI-RS-based neighboring cell mobility measurements are taken into account, and the UE performs the neighboring cell measurement using the measurement gap combination with the maximum MGL in the two measurement gap combinations, considering the duration requirements of both the SSB-based and the CSI-RS-based neighboring cell mobility measurements, so that the UE can acquire the appropriate cell for handover.

The embodiment of the disclosure provides another method for neighboring cell measurement. FIG. 3 is a flowchart of another method for neighboring cell measurement according to an embodiment of the disclosure. The method is executed by a network device. As illustrated in FIG. 3, the method for neighboring cell measurement includes the following steps.

At step S301, at least one measurement gap combination is sent to a UE to instruct the UE to perform SSB based neighboring cell measurement and/or CSI-RS-based neighboring cell measurement based on the measurement gap combination.

The network device configures at least one measurement gap combination for the UE and sends the at least one configured measurement gap combination to the UE. Optionally, the network device may configure the at least one measurement gap combination via an IE MeasConfig signaling. In some implementations, the network device sends a configuration parameter of the measurement gap combination, an SSB resource and a CSI-RS resource to the UE simultaneously. In some implementations, the network device sends the SSB resource and the CSI-RS resource to the UE, and then sends the configuration parameter of the measurement gap combination to the UE via the IE MeasConfig signaling.

Optionally, the measurement gap combination at least includes a MGL and a MGRP.

In a possible implementation, one measurement gap combination is configured for the UE. The network device compares the SMTC corresponding to the SSB-based neighboring cell measurement and a resource length of a CSI-RS resource corresponding to the CSI-RS-based neighboring cell measurement, and configures a maximum value of the SMTC and the resource length of the CSI-RS resource as the MGL in the measurement gap combination. In this implementation, the MGL in the configured measurement gap combination is the maximum value of the SMTC and the resource length of the CSI-RS resource. That is, by considering the SSB-based and CSI-RS-based neighboring cell mobility measurements, the configured MGL can be greater than or equal to the length of the CSI-RS resource, which enables to implement the measurement of CSI-RS signals.

It is noted that there may be multiple pieces of SMTC corresponding to the SSB-based neighboring cell measurement, which are labeled as $D_{SMTC,i}$, and there may be multiple CSI-RS resources corresponding to the CSI-RS-based neighboring cell measurement, with the lengths of the CSI-RS resources marked as $D_{CSI\text{-}RS,i}$. The network device may obtain each piece of SMTC corresponding to the SSB-based neighboring cell measurement, and the length of each CSI-RS resource. Further, a maximum value is determined by comparing all the multiple pieces of SMTC and the lengths of all the multiple CSI-RS resources, and the maximum value is configured as the MGL in the measurement gap combination. For example, the maximum value is determined by $MAX(D_{SMTC,i}, D_{CSI\text{-}RS,i})$. Optionally, a maximum value may be determined from all the multiple pieces of SMTC, and a maximum value may be determined from the lengths of all the multiple CSI-RS resources, respectively, and then a greater one of the above two maximum values may be determined and configured as the MGL in the measurement gap combination, e.g., by $MAX(MAX_{D_{SMTC,i}}, MAX_{D_{CSI\text{-}RS,i}})$.

In another possible implementation, the network device configures two measurement gap combinations for the UE, i.e., the first measurement gap combination configured for the SSB-based neighboring cell measurement and the second measurement gap combination configured for the CSI-RS-based neighboring cell measurement. Each measurement gap combination includes a respective MGL and a respective MGL MGRP. When configuring the measurement gap, for both SSB-based and CSI-RS-based neighboring cell mobility measurements, the MGL in each measurement gap combination can meet the length requirement of neighboring cell mobility measurement. The MGL in the second measurement gap combination configured for the CSI-RS-based neighboring cell mobility measurement can be greater than or equal to the length of the CSI-RS resource, which can implement the measurement of CSI-RS signals.

After acquiring the measurement gap combination sent by the network device, the UE can obtain the MGL and the MGRP from the measurement gap combination and perform the neighboring cell mobility measurement based on the MGL and the MGRP.

In the embodiment of the disclosure, the UE receives the at least one measurement gap combination configured for the UE sent by the network device, and performs the SSB-based and/or the CSI-RS-based neighboring cell measurements based on the measurement gap combination. By configuring the measurement gap combination, both the SSB-based neighboring cell mobility measurement and the CSI-RS-based neighboring cell mobility measurement can be taken into account, so that the UE can acquire an appropriate cell for handover.

Corresponding to the method for neighboring cell measurement according to the above embodiments, the disclosure also provides an apparatus for neighboring cell measurement. Since the apparatus for neighboring cell measurement provided by the embodiment of the disclosure corresponds to the method for neighboring cell measurement provided by the embodiments in FIGS. 1 to 3 above, the implementation of the method for neighboring cell measurement is also applicable to the apparatus for neighboring cell measurement provided by this embodiment and will not be described in detail in this embodiment. FIG. 4 is a block diagram of an apparatus for neighboring cell measurement according to an embodiment of the disclosure.

As illustrated in FIG. 4, the apparatus 100 for neighboring cell measurement is applicable to a UE. The apparatus 100 includes: an obtaining module 110 and a measuring module 120.

The obtaining module 110 is configured to obtain at least one measurement gap combination configured for the UE.

The measuring module 120 is configured to perform SSB-based neighboring cell measurement and/or CSI-RS-based neighboring cell measurement based on the measurement gap combination.

Optionally, the measurement gap combination at least includes a MGL and a MGRP.

Optionally, when there is one measurement gap combination, a maximum value of SMTC for the SSB-based neighboring cell measurement and a resource length of a CSI-RS resource for the CSI-RS-based neighboring cell measurement is determined as the MGL in the measurement gap combination.

Optionally, the obtaining module 110 is further configured to: receive a first measurement gap combination configured for the SSB-based neighboring cell measurement and a second measurement gap combination configured for the CSI-RS-based neighboring cell measurement sent by a network device.

Optionally, the measuring module 120 is further configured to: in response to the SSB resource and the CSI-RS resource not being overlapped in a time domain, measure an SSB signal corresponding to the SSB resource based on the first measurement gap combination, and measure a CSI-RS signal corresponding to the CSI-RS resource based on the second measurement gap combination.

Optionally, the measuring module 120 is further configured to: in response to the SSB resource and the CSI-RS resource being overlapped in the time domain, determine one of the first measurement gap combination and the second measurement gap combination as a target measurement gap combination to be used in measurement, and measure an SSB signal corresponding to the SSB resource and/or a CSI-RS signal corresponding to the CSI-RS resource based on the target measurement gap combination.

Optionally, the measuring module 120 is further configured to: comparing a MGL in the first measurement gap combination with a MGL in the second measurement gap combination, and determine a measurement gap combination corresponding to a maximum value of the two MGLs as the target measurement gap combination.

Optionally, the obtaining module 110 is further configured to: receive a measurement configuration signaling from a network device, in which the measurement configuration signaling carries the at least one measurement gap combination.

In the embodiment of the disclosure, the UE receives the at least one measurement gap combination configured for the UE sent by the network device, and performs the SSB-based and/or CSI-RS-based neighboring cell measurements based on the measurement gap combination. By configuring the measurement gap combination, both the SSB-based and CSI-RS-based neighboring cell mobility measurements are taken into account, so that the UE can acquire an appropriate cell for handover.

FIG. 5 is a block diagram of an apparatus for neighboring cell measurement according to an embodiment of the disclosure.

As illustrated in FIG. 5, the apparatus 200 for neighboring cell measurement is applicable to a network device. The apparatus 200 includes: a sending module 210.

The sending module 210 is configured to send at least one measurement gap combination to a UE to instruct the UE to perform SSB-based neighboring cell measurement and/or CSI-RS-based neighboring cell measurement based on the measurement gap combination.

Optionally, the measurement gap combination at least includes a MGL and a MGRP.

Optionally, the sending module 210 is further configured to: in response to sending one measurement gap combination to the UE, obtain a maximum value from SMTC corresponding to the SSB-based neighboring cell measurement and a resource length of a CSI-RS resource, and configure the MGL in the measurement gap combination based on the maximum value.

Optionally, the sending module 210 is further configured to: send a first measurement gap combination configured for the SSB-based neighboring cell measurement and a second measurement gap combination configured for the CSI-RS-based neighboring cell measurement to the UE.

Optionally, the sending module 210 is further configured to: send a measurement configuration signaling to the UE, in which the measurement configuration signaling carries the at least one measurement gap combination.

In the embodiment of the disclosure, the UE receives the at least one measurement gap combination configured for the UE sent by the network device, and performs the SSB-based and/or the CSI-RS-based neighboring cell measurements based on the measurement gap combination. By configuring the measurement gap combination, both the SSB-based and CSI-RS-based neighboring cell mobility measurements are taken into account, so that the UE can acquire an appropriate cell for handover.

According to the embodiments of the disclosure, the disclosure also provides a communication device and a readable storage medium.

As illustrated in FIG. 6, the communication device includes: one or more processors 1100, a memory 1200, and interfaces for connecting respective components, including a high-speed interface and a low-speed interface. The components are interconnected using different buses and may be mounted on a common main board or otherwise mounted as desired. The processor may process instructions executed within the communication device, including instructions stored in or on the memory to display graphical information of the GUI on an external input/output device (e.g., a display device coupled to the interface). In other implementations, multiple processors and/or buses may be used together with multiple memories, if desired. Similarly, a plurality of communication devices can be connected each providing a part of necessary operations (e.g., as a server array, a group of blade servers, or a multiprocessor system). An example of a processor 1100 is shown in FIG. 6.

The memory 1200 is the non-transitory computer readable storage medium provided in the disclosure. The memory stores instructions executable by at least one processor, to cause the at least one processor to execute the method for neighboring cell measurement provided by the disclosure. The non-transitory computer readable storage medium of the disclosure stores computer instructions that are used to cause a computer to implement the method for neighboring cell measurement provided by the disclosure.

As a non-transitory computer readable storage medium, the memory 1200 can be used to store non-transitory software programs, non-transitory computer executable programs and modules, such as the program instructions/modules corresponding to the method for neighboring cell measurement in the embodiments of the disclosure (e.g., the obtaining module 110 and the measuring module 120 shown in the FIG. 4). The processor 1100 executes various functional applications and data processing of the server by running the non-transitory software programs, instructions, and modules stored in the memory 1200, i.e., implement the method for neighboring cell measurement in the method embodiments described above.

The memory 1200 may include a program storage area and a data storage area. The program storage area may store an operating system, and applications required by at least one function. The data storage area may store data created based on the use of the communication device, and the like. In addition, the memory 1200 may include a high-speed random access memory, and a non-transitory memory, such as at least one disk memory device, flash memory device, or other non-transitory solid state memory device. Optionally, the memory 1200 may include memories that are remotely set relative to the processor 1100, and these remote memories may be connected to the communication device via a network. Examples of the above network include, but are not limited to, the Internet, corporate intranets, local area networks, mobile communication networks, and combinations thereof.

The communication device may also include: an input device 1300 and an output device 1400. The processor 1100, the memory 1200, the input device 1300, and the output device 1400 may be connected via buses or otherwise. For example, the connections in FIG. 6 are implemented by buses.

The input device 1300 may receive input numbers or character information, and generate key signal input related to user settings and functional control for the communication device, such as a touch screen, a keypad, a mouse, a trackpad, a touchpad, an indicator rod, one or more mouse buttons, a trackball, a joystick, and other input devices. The output device 1400 may include a display device, an auxiliary illuminating device (e.g., LED), and a haptic feedback device (e.g., a vibration motor), etc. The display device may include, but is not limited to, a Liquid Crystal Display (LCD), a Light Emitting Diode (LED) display, and a plasma display. In some embodiments, the display device may be a touch screen.

Various implementations of the systems and techniques described herein may be implemented in a digital electronic circuit system, an integrated circuit system, an Application Specific Integrated Circuit (ASIC), computer hardware, firmware, software, and/or combinations thereof. These various implementations may include: implementations in one or more computer programs, in which the one or more computer programs may be executed and/or interpreted on a programmable system including at least one programmable processor, which may be a dedicated or general-purpose programmable processor that may receive data and instructions from a storage system, at least one input device, and at least one output device, and send the data and instructions to the storage system, the at least one input device, and the at least one output device.

These computing programs (also referred to as programs, software, software applications, or codes) include machine instructions for a programmable processor and may be implemented using high-level procedural and/or objectoriented programming languages, and/or assembly/machine languages. As used herein, the terms "machine-readable medium" and "computer-readable medium" refer to any computer program product, device, and/or apparatus (e.g., disk, a Compact Disc Read-Only Memory (CD-ROM), a memory, a Programmable Logic Device (PLD)) used to provide machine instructions and/or data to a programmable processor, including a machine-readable medium that receives machine instructions as machine-readable signals. The term "machine-readable signal" refers to any signal used to provide machine instructions and/or data to the programmable processor.

In order to provide interaction with a user, the systems and techniques described herein may be implemented on a computer having a display device (e.g., a Cathode Ray Tube (CRT) or a Liquid Crystal Display (LCD) monitor) for displaying information to the user; and a keyboard and a pointing device (such as a mouse or a trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or computing system that includes any combination of such background components, middleware components, or front-end components. The components of the system may be interconnected by any form or medium of digital data communication (e.g., a communication network). Examples of the communication network include: a Local Area Network (LAN), a Wide Area Network (WAN), and the Internet.

The computer system may include a client and a server. The client and server are generally remote from each other and interacting through a communication network. The client-server relation is generated by computer programs running on the respective computers and having a client-server relation with each other.

In the embodiment of the disclosure, the UE receives the at least one measurement gap combination configured for the UE sent by the network device, and performs the SSB-based and/or CSI-RS-based neighboring cell measurements based on the measurement gap combination. By configuring the measurement gap combination, both the SSB-based and CSI-RS-based neighboring cell mobility measurements are taken into account, so that the UE can acquire an appropriate cell for handover.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, the functional units in the embodiments of the disclosure may be integrated in one processing module or may be separately physically present, or two or more units may be integrated in one module. The integrated module as described above may be implemented in the form of hardware, or may be implemented in the form of a software functional module. If the integrated module is implemented in the form of a software functional module and sold or used as a separate product, the integrated module may also be stored in a computer readable storage medium.

The storage medium mentioned above can be a ROM, a magnetic disk or an optical disk.

The disclosure provides a method for neighboring cell measurement, an apparatus for neighboring cell measurement, a communication device and a storage medium, which can balancing SSB-based neighboring cell mobility measurement and CSI-RS-based neighboring cell mobility measurement by configuring a measurement gap combination, so that the UE can acquire an appropriate cell for handover.

According to a first aspect of embodiments of the disclosure, a method for neighboring cell measurement, applicable to a UE, is provided. The method includes: obtaining at least one measurement gap combination configured for the UE; and performing synchronization signal block (SSB)-based neighboring cell measurement and/or channel state information reference signal (CSI-RS)-based neighboring cell measurement based on the measurement gap combination.

In an embodiment, the measurement gap combination at least includes a measurement gap length and a measurement gap repetition period.

In an embodiment, the method further includes: in response to one measurement gap combination, determining a maximum value of SSB-based radio resource management (RRM) measurement timing configuration (SMTC) for the SSB-based neighboring cell measurement and a resource length of a CSI-RS resource for the CSI-RS-based neighboring cell measurement as the measurement gap length in the measurement gap combination.

In an embodiment, obtaining the at least one measurement gap combination configured for the UE includes: receiving a first measurement gap combination configured for the SSB-based neighboring cell measurement and a second measurement gap combination configured for the CSI-RS-based neighboring cell measurement sent by a network device.

In an embodiment, performing the SSB-based neighboring cell measurement and/or the CSI-RS-based neighboring cell measurement based on the measurement gap combination includes:

in response to the SSB resource and the CSI-RS resource not being overlapped in a time domain, measuring an SSB signal corresponding to the SSB resource based on the first measurement gap combination; and measuring a CSI-RS signal corresponding to the CSI-RS resource based on the second measurement gap combination.

In an embodiment, performing the SSB-based neighboring cell measurement and/or the CSI-RS-based neighboring cell measurement based on the measurement gap combination includes:

in response to the SSB resource and the CSI-RS resource being overlapped in the time domain, determining one of the first measurement gap combination and the second measurement gap combination as a target measurement gap combination to be used in measurement; and measuring an SSB signal corresponding to the SSB resource and/or a CSI-RS signal corresponding to the CSI-RS resource based on the target measurement gap combination.

In an embodiment, determining one from the first measurement gap combination and the second measurement gap combination as the target measurement gap combination to be used in the measurement includes: comparing a measurement gap length in the first measurement gap combination with a measurement gap length in the second measurement gap combination, and determining a measurement gap combination corresponding to a maximum value of the two measurement gap lengths as the target measurement gap combination.

In an embodiment, obtaining the at least one measurement gap combination configured for the UE includes: receiving a measurement configuration signaling from a network device, in which the measurement configuration signaling carries the at least one measurement gap combination.

According to a second aspect of embodiments of the disclosure, a method for neighboring cell measurement, applicable to a network device, is provided. The method includes: sending at least one measurement gap combination to a UE to instruct the UE to perform SSB-based neighboring cell measurement and/or CSI-RS-based neighboring cell measurement based on the measurement gap combination.

In an embodiment, the measurement gap combination at least includes a measurement gap length and a measurement gap repetition period.

In an embodiment, sending the at least one measurement gap combination to the UE includes: in response to sending one measurement gap combination to the UE, obtaining a maximum value from SMTC corresponding to the SSB-based neighboring cell measurement and a resource length of a CSI-RS resource, and configuring the measurement gap length in the measurement gap combination based on the maximum value.

In an embodiment, sending the at least one measurement gap combination to the UE includes: sending a first measurement gap combination configured for the SSB-based neighboring cell measurement and a second measurement gap combination configured for the CSI-RS-based neighboring cell measurement to the UE.

In an embodiment, sending the at least one measurement gap combination to the UE includes: sending a measurement configuration signaling to the UE, in which the measurement configuration information carries the at least one measurement gap combination.

According to a third aspect of embodiments of the disclosure, an apparatus for neighboring cell measurement, applicable to a UE, is provided. The apparatus includes: an obtaining module, configured to obtain at least one measurement gap combination configured for the UE; and a measuring module, configured to perform SSB-based neighboring cell measurement and/or CSI-RS-based neighboring cell measurement based on the measurement gap combination.

According to a fourth aspect of embodiments of the disclosure, an apparatus for neighboring cell measurement, applicable to a network device, is provided. The apparatus includes: a sending module, configured to send at least one measurement gap combination to a UE to instruct the UE to perform SSB-based neighboring cell measurement and/or CSI-RS-based neighboring cell measurement based on the measurement gap combination.

According to a fifth aspect of embodiments of the disclosure, a communication device is provided. The communication device includes: at least one processor and a memory communicatively connected to the at least one processor. The memory stores instructions executable by the at least one processor, and when the instructions are executed by the at least one processor, the at least one processor is caused to implement the method for neighboring cell measurement according to the first aspect of the embodiments of the disclosure or the method for neighboring cell measurement according to the second aspect of the embodiments of the disclosure.

According to a sixth aspect of embodiments of the disclosure, a computer storage medium having computer-executable instructions stored thereon is provided. When the computer-executable instructions are executed by a processor, the method for neighboring cell measurement according to the first aspect of the embodiments of the disclosure or the method for neighboring cell measurement according to the second aspect of the embodiments of the disclosure is implemented.

The above is only the optimal embodiments of the disclosure, and it should be pointed out that those skilled in the art can make several improvements and modifications without departing from the principle of the disclosure, and these improvements and modifications should also be regarded as the protection scope of the disclosure.

What is claimed is:

1. A method for neighboring cell measurement, performed by a user equipment (UE), comprising:

obtaining at least one measurement gap combination configured for the UE; and performing at least one of synchronization signal block (SSB)-based neighboring cell measurement or channel state information reference signal (CSI-RS)-based neighboring cell measurement based on the at least one measurement gap combination;

wherein obtaining the at least one measurement gap combination configured for the UE comprises:

receiving a first measurement gap combination configured for the SSB-based neighboring cell measurement and a second measurement gap combination configured for the CSI-RS-based neighboring cell measurement sent by a network device;

wherein performing at least one of the SSB-based neighboring cell measurement or the CSI-RS-based neighboring cell measurement based on the at least one measurement gap combination comprises:

determining a SSB resource and a CSI-RS resource being overlapped in the time domain, determining one of the first measurement gap combination and the second measurement gap combination as a target measurement gap combination to be used in measurement; and measuring at least one of an SSB signal corresponding to the SSB resource or a CSI-RS signal corresponding to the CSI-RS resource based on the target measurement gap combination.

2. The method of claim 1, wherein the at least one measurement gap combination comprises a measurement gap length and a measurement gap repetition period.

3. The method of claim 2, further comprising:

determining a number of at least one measurement gap combination being one, determining a maximum value of a length of SSB-based radio resource management (RRM) measurement timing configuration (SMTC) for the SSB-based neighboring cell measurement and a resource length of a CSI-RS resource for the CSI-RS-based neighboring cell measurement as the measurement gap length in the measurement gap combination.

4. The method of claim 1, wherein performing at least one of the SSB-based neighboring cell measurement or the CSI-RS-based neighboring cell measurement based on the at least one measurement gap combination comprises:

determining a SSB resource and a CSI-RS resource not being overlapped in a time domain, measuring an SSB signal corresponding to the SSB resource based on the first measurement gap combination; and measuring a CSI-RS signal corresponding to the CSI-RS resource based on the second measurement gap combination.

5. The method of claim 1, wherein determining one from the first measurement gap combination and the second measurement gap combination as the target measurement gap combination to be used in the measurement comprises:

comparing a first measurement gap length in the first measurement gap combination with a second measurement gap length in the second measurement gap combination, and determining a measurement gap combination corresponding to a maximum value of the first measurement gap length and the second measurement gap length as the target measurement gap combination.

6. The method of claim 1, wherein obtaining the at least one measurement gap combination configured for the UE comprises:

receiving a measurement configuration signaling from a network device, wherein the measurement configuration signaling carries the at least one measurement gap combination.

7. A method for neighboring cell measurement, performed by a network device, comprising:

sending at least one measurement gap combination to a UE to instruct the UE to perform at least one of SSB-based neighboring cell measurement or CSI-RS-based neighboring cell measurement based on the measurement gap combination;

wherein sending the at least one measurement gap combination to the UE comprises:

sending a first measurement gap combination configured for the SSB-based neighboring cell measurement and a second measurement gap combination configured for the CSI-RS-based neighboring cell measurement to the UE;

wherein performing at least one of the SSB-based neighboring cell measurement or the CSI-RS-based neighboring cell measurement based on the at least one measurement gap combination comprises:

determining a SSB resource and a CSI-RS resource being overlapped in the time domain, determining one of the first measurement gap combination and the second measurement gap combination as a target measurement gap combination to be used in measurement; and measuring at least one of an SSB signal corresponding to the SSB resource or a CSI-RS signal corresponding to the CSI-RS resource based on the target measurement gap combination.

8. The method of claim 7, wherein the at least one measurement gap combination comprises a measurement gap length and a measurement gap repetition period.

9. The method of claim 8, wherein sending the at least one measurement gap combination to the UE comprises:

sending one measurement gap combination to the UE, obtaining a maximum value from a length of SMTC corresponding to the SSB-based neighboring cell measurement and a resource length of a CSI-RS resource, and configuring the measurement gap length in the measurement gap combination based on the maximum value.

10. The method of claim 7, wherein sending the at least one measurement gap combination to the UE comprises:

sending a measurement configuration signaling to the UE, wherein the measurement configuration signaling carries the at least one measurement gap combination.

11. A communication device, comprising:

at least one processor; and a memory communicatively connected to the at least one processor; wherein the memory stores instructions executable by the at least one processor, and the instructions are executed by the at least one processor, the at least one processor is caused to implement a method for neighboring cell measurement, the method comprising:

obtaining at least one measurement gap combination configured for the communication device; and performing at least one of synchronization signal block (SSB)-based neighboring cell measurement or channel state information reference signal (CSI-RS)-based neighboring cell measurement based on the at least one measurement gap combination;

wherein obtaining the at least one measurement gap combination configured for the UE comprises:

receiving a first measurement gap combination configured for the SSB-based neighboring cell measurement and a second measurement gap combination configured for the CSI-RS-based neighboring cell measurement sent by a network device;

wherein performing at least one of the SSB-based neighboring cell measurement or the CSI-RS-based neighboring cell measurement based on the at least one measurement gap combination comprises:

determining a SSB resource and a CSI-RS resource being overlapped in the time domain, determining one of the first measurement gap combination and the second measurement gap combination as a target measurement gap combination to be used in measurement; and measuring at least one of an SSB signal corresponding to the SSB resource or a CSI-RS signal corresponding to the CSI-RS resource based on the target measurement gap combination.

12. A non-transitory computer storage medium having computer-executable instructions stored thereon, wherein when the computer-executable instructions are executed by a processor, the method of claim 1 is implemented.

13. The method of claim 2, wherein obtaining the at least one measurement gap combination configured for the UE comprises:

receiving a first measurement gap combination configured for the SSB-based neighboring cell measurement and a second measurement gap combination configured for the CSI-RS-based neighboring cell measurement sent by a network device.

14. The method of claim 8, wherein sending the at least one measurement gap combination to the UE comprises:

sending a first measurement gap combination configured for the SSB-based neighboring cell measurement and a second measurement gap combination configured for the CSI-RS-based neighboring cell measurement to the UE.

15. The method of claim 8, wherein sending the at least one measurement gap combination to the UE comprises:

sending a measurement configuration signaling to the UE, wherein the measurement configuration signaling carries the at least one measurement gap combination.

16. A communication device, comprising:

at least one processor; and a memory communicatively connected to the at least one processor; wherein the memory stores instructions executable by the at least one processor, and the instructions are executed by the at least one processor, the at least one processor is caused to implement the method for neighboring cell measurement of claim 7.

17. A non-transitory computer storage medium having computer-executable instructions stored thereon, wherein when the computer-executable instructions are executed by a processor, the method of claim 7 is implemented.

* * * * *